| United States Patent [19] | [11] 3,759,989 |
| Jezic | [45] Sept. 18, 1973 |

[54] BIS(P-PHENOXYPHENYL)IODONIUM SALTS

[75] Inventor: Zdravko Jezic, Midland, Mich.

[73] Assignee: The Dow Chemical Company, Midland, Mich.

[22] Filed: Nov. 2, 1970

[21] Appl. No.: 86,387

[52] U.S. Cl........... 260/539 A, 260/613 R, 260/350, 260/999
[51] Int. Cl............................................. C07c 43/28
[58] Field of Search............ 260/350, 612 R, 539 A, 260/613 R

[56] References Cited
UNITED STATES PATENTS

| 2,878,293 | 3/1959 | Kinzer | 260/350 |
| 3,332,991 | 7/1967 | Cannon | 260/350 X |
| 3,422,152 | 10/1969 | Doub | 260/350 X |
| 3,506,719 | 4/1970 | Cannon | 260/350 X |

FOREIGN PATENTS OR APPLICATIONS

| 1,051,823 | 12/1966 | Great Britain | 260/612 |

*Primary Examiner*—Bernard Helfin
*Attorney*—Griswold & Burdick, Theodore Post and C. Kenneth Bjork

[57] ABSTRACT

A 4-(diacetoxyiodo)diphenyloxide is condensed with a diphenyloxide in the presence of a condensing agent such as trichloroacetic acid or trifluoroacetic acid to form a new bis(p-phenoxyphenyl)iodonium trifluoroacetate or trichloroacetate salt. The 4-(diacetoxyiodo)diphenyloxide and the diphenyloxide reagents each may have a halo, a loweralkyl, or a loweralkoxy substituent on their unsubstituted phenyl nucleus to give symmetrical and unsymmetrical bis(p-phenoxyphenyl)iodonium trichloroacetates or trifluoroacetates. Such salts can be converted to other salt forms in usual ways. The novel products have antimicrobial activity.

5 Claims, No Drawings

BIS(P-PHENOXYPHENYL)IODONIUM SALTS

BACKGROUND OF THE INVENTION

While diphenyliodonium salts and some substituted diphenyliodonium salts are known, no bis(p-phenoxyphenyl)- iodonium salts nor any iodonium salts having a close relationship to such salts are known.

SUMMARY OF THE INVENTION

A new type of iodonium salt containing diphenyloxide (hereinafter DPO) moieties has been prepared by condensing a 4-(diacetoxyiodo)DPO with a DPO in the presence of trichloroacetic acid (hereinafter TCA) or trifluoroacetic acid (hereinafter TFA) as condensing agent according to the following equation:

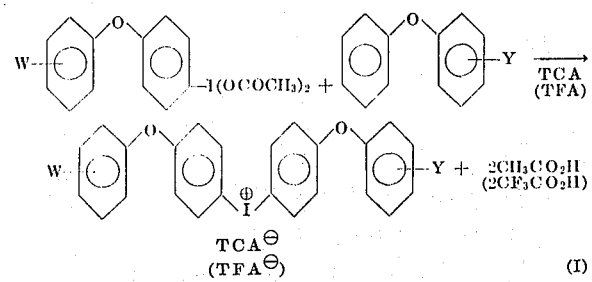

In the equation, W and Y each represents H (i.e., no substitution), halo (fluoro, chloro, bromo or iodo), loweralkyl or loweralkoxy, $TCA^-$ represents the trichloroacetate anion and $TFA^-$ represents the trifluoroacetate anion. The terms "loweralkyl" and "loweralkoxy" refer to groups containing from one to four carbon atoms, such as, for example, methyl, ethyl, propyl, butyl, methoxy, ethoxy, propoxy and butoxy.

The reaction is preferably carried out in an organic liquid as reaction medium such as, for example, methylene chloride, ethylene chloride, carbon tetrachloride, methyl chloroform, and the like chlorinated hydrocarbon solvents and mixtures thereof. The reaction goes forward when the reagents are employed in any amounts. The reaction consumes the reagents in molar proportions of substantially one of the 4-(diacetoxyiodo)diphenyloxide reagent to one of the DPO reagent to two of the trichloroacetic acid (or trifluoroacetic acid) reagent. However, optimum results are obtained when proportions of substantially 3 to 4 moles of trichloroacetic acid (or trifluoroacetic acid), 2 moles of the DPO reagent and 1 mole of the 4-(diacetoxyiodo)DPO reagent are used, and the use of such amounts represents preferred practice. The reaction proceeds at temperatures ranging between room temperature up to about 50° C. The reaction is completed in a time ranging between about several minutes up to about 1 hour. Completion of the reaction is indicated by a negative potassium iodide-starch paper test. Upon completion of the reaction, the product is separated from one reaction medium by conventional procedures and the excess of trichloroacetic acid or trifluoroacetic acid is recovered.

In a convenient method of carrying out the reaction, the trichloroacetic acid (or trifluoroacetic acid) and the 4-(diacetoxyiodo)DPO reagent are brought together in the reaction medium and the DPO reagent added portionwise thereto with agitation. The reaction is slightly exothermic and goes forward readily with the addition of the DPO reagent. The temperature of the reaction mixture can be controlled by regulating the rate of addition of the DPO reagent and by external cooling. The reaction essentially is complete upon completion of the addition of the DPO reagent. Allowing the reaction mixture to stand for a short period of time at temperatures up to about 50°C. drives the reaction to completion and oftentimes gives some improvement in yield. Upon completion of the reaction, the volatile components of the reaction mixture are distilled off under reduced pressure. The residual oily product crystallizes upon addition of a suitable nonpolar solvent, such as, for example, ether, chloroform, n-hexane, or mixtures thereof. The products are identified by melting point determinations, elemental analyses, infrared (ir) and nuclear magnetic resonance (nmr) spectra.

The products of this invention are crystalline solid materials having relatively high decomposition points. They are relatively insoluble in water and somewhat soluble in solvents like acetone, alcohol, dimethylformamide or dimethylsulfoxide.

The trichloroacetate and trifluoroacetate salts are conveniently converted into other salts by treatment with an acid according to the following equation wherein the prototype compound as its $TCA^-$ or $TFA^-$ salt is represented:

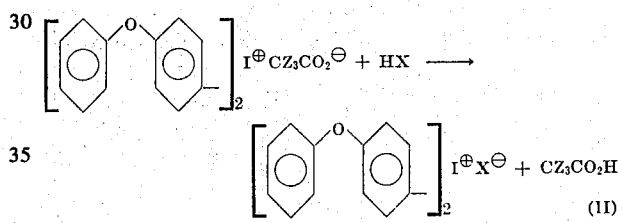

In the equation, X represents halide (fluoride, chloride, bromide), hydrogen sulfate or another anion and Z represents Cl or F.

DESCRIPTION OF SOME PREFERRED EMBODIMENTS

The following examples describe completely representative specific embodiments of the novel compounds and methods for their preparation and best modes contemplated by the inventor for carrying out the same, but are not to be considered as limiting thereof. Temperatures are given in centigrade degrees.

Example 1: bis(p-Phenoxyphenyl)iodonium trichloroacetate

To a solution of 4.2 g. (0.01 mole) 4-(diacetoxyiodo)DPO and 6.5 g. (0.04 mole) trichloroacetic acid in 50 ml. of methylene chloride is added 3.4 g. (0.02 mole) of DPO at a reaction temperature of 40° for a 30-minute period. Volatile components are removed under reduced pressure and the brown oily residue is treated with 100 ml. of absolute alcohol (Formula 2B). Upon addition of 5 ml. of n-hexane, a slow crystallization of the product begins. The titular product, as crystalline, slightly off-white needles, is filtered off and dried; m.p. 191°–5° (dec.). Mother liquor is treated with 2 ml. of concentrated hydrochloric acid and chilled. Upon standing, a white crystalline solid, the chloride salt, is obtained which, when dry, melts at 200°–1° (dec.). Yield: 2.9 g. of the trichloroacetate salt (0.00462 mole), 0.8 g. of the chloride salt (0.00139 mole); total yield: 0.00601 mole (approx. 60%). A quantity of 0.5 g. of the trichloroacetate salt when recrystallized from 15 ml. of absolute alcohol (Formula 2B) gives white crystals which melt at 190°–194° (dec.).

Analysis, weight percent:
Calculated for $C_{26}H_{18}Cl_3IO_4$:
C, 49.74; H, 2.89; I, 20.21;
Found:
C, 49.6; H, 3,13; I, 20.5.

Both nmr and ir analysis support the assigned structure.

Example 2: bis(p-Phenoxyphenyl)iodonium bromide

A quantity of 1 g. of bis(p-phenoxyphenyl)iodonium trichloroacetate, from Example 1, is dissolved in 40 ml. of warm methanol and treated with 0.5 ml. of aqueous 48% HBr. A white crystalline solid precipitates out of solution immediately upon addition of the acid. The bromide salt so obtained is filtered off, washed with acetone and dried to give a white crystalline solid, m.p. 208° (dec.). The ir spectrum (Nujol mull) of the bromide salt is very similar to that of the corresponding chloride salt.

Example 3: (p-(p-chlorophenoxyphenyl)(p-phenoxyphenyl)-iodonium trifluoroacetate A solution of 0.01 mole of 4-(diacetoxyiodo)--4'-chloro DPO and 0.04 mole of trifluoroacetic acid in 50 ml. of methylene chloride is treated with 0.02 mole of DPO at 40° C. for 30 minutes with stirring under reflux. Volatile components are removed under reduced pressure to leave a dark oily residue. The oily residue is diluted with 85 ml. of acetone, activated charcoal is added and stirred at the boil for 5 minutes. The resulting mixture is filtered over Celite filter aid while hot to give the titular compound as a pale yellowish filtrate. The filtrate is treated with 0.5 ml. of concentrated hydrochloric acid to precipitate out an off-white crystalline solid, the corresponding iodonium chloride salt in a yield of approximately 65%.

The following products are prepared using procedures as in Example 3:

bis(p-(p-chlorophenoxy)phenyl)iodonium trifluoroacetate and chloride by condensing 4-diacetoxyiodo)-4'-chloro DPO with p-chloro DPO, molecular weight of TFA⁻ salt 647.23 and of Cl⁻ salt 569.66.

(p-(p-chlorophenoxy) phenyl) (p-(p-tolyloxy)-phenyl) iodonium trifluoroacetate and chloride by condensing 4-(diacetoxyiodo)-4'-chloro DPO with p-tolyloxybenzene, molecular weight of TFA⁻ salt 626.79 and of Cl⁻ salt 549.22.

The bis(p-phenoxyphenyl)iodonium salts of this invention have antimicrobial properties. They have high toxicity toward such bacterial organisms as Staphylococcus aureus, Mycobacterium phlei and Bacillus subtilis and toward such fungal organisms as Trichophyton mentagrophytes, Pullularia pullulans, Cephaloascus fragans and Ceratocystis ips. This is not to suggest that the compounds claimed and compositions containing them are equally effective at similar concentrations or against the same organisms. The compounds may be applied in cidal amounts to such bacterial and fungal plants and their habitats to obtain control of the microbial organisms which attack seeds, roots or above-ground portions of terrestrial plants. For such uses the unmodified compounds can be employed. The compounds can also be dispersed on an inert finely-divided solid and employed as dusts. Such mixtures can also be dispersed in water with or without the aid of a surface-active agent and employed as sprays. In other procedures, the products can be employed as active constituents in solvent solutions, aqueous dispersions or oil-in-water and water-in-oil emulsions. Good results are obtained with methods employing and compositions containing microbicidal or antimicrobial amounts of the novel compounds. Preferred compositions contain from 0.001 to 50 percent by weight of compound. The compounds may be included in adhesives, cooling waters, inks, plasticizers, latices, polymers, resins, fuels, greases, soaps, detergents, cutting oils and oil or latex paints to prevent mold and mildew and the degradation of such products resulting from microbial attack. Also, it has been discovered that the compounds advantageously may be distributed on or in textiles, fabrics and paper or other cellulosic products, or may be employed in the impregnation of wood, lumber, wallboard and plaster to protect such products from the attack of the organisms of rot, mold, mildew and decay.

In representative operations, each of bis(p-phenoxyphenyl)iodonium trichloroacetate; bis(p--phenoxyphenyl) iodonium bromide; (p-(p-chlorophenoxy)-phenyl) (p-phenoxyphenyl)iodonium trifluoroacetate; and (p-(p-tolyloxy)phenyl) (p-phenoxyphenyl)iodonium trifluoroacetate gives complete kills and controls of Staphylococcus aureus, Mycobacterium phlei, Trichophyton mentagrophytes, Bacillus subtilis, Pullularia pullulans, Cephaloascus fragans and Ceratocystis ips. when employed in nutrient broth at a concentration of parts per million by weight.

The 4-(diacetoxyiodo)diphenyl ether starting materials are prepared by reacting 4-iododiphenyl ether or a w-substituted-4-iododiphenyl ether with peracetic acid in the presence of glacial acetic acid; Sharefkin and Saltzman, Anal. Chem., 35, No. 10, 1428 (1963). The W-and Y-substituted diphenyl ethers are prepared in conventional ways.

What is claimed is:

1. A compound corresponding to the formula

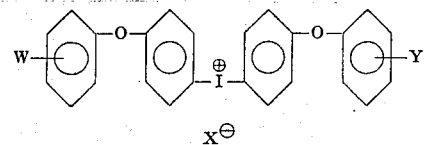

wherein W and Y each represents one of H, halo, loweralkyl or loweralkoxy and X represents trichloroacetate, trifluoroacetate, fluoride, chloride, bromide or hydrogen sulfate.

2. The compound of claim 1 wherein W and Y each represents H and X represents trichloroacetate, chloride or bromide.

3. The compound of claim 1 wherein W represents chloro, Y represents H and X represents trifluoroacetate or chloride.

4. The compound of claim 1 wherein W and Y each represents chloro and X represents trifluoroacetate or chloride.

5. The compound of claim 1 wherein W represents chloro, Y represents methyl and X represents trifluoroacetate or chloride.

* * * * *

UNITED STATES PATENT OFFICE
CERTIFICATE OF CORRECTION

Patent No. 3,759,989     Dated September 18, 1973

Inventor(s) Zdravko Jezic

It is certified that error appears in the above-identified patent and that said Letters Patent are hereby corrected as shown below:

Column 3, line 13, delete "3,13" and substitute --3.13--.

Column 4, line 34, insert --20-- before parts per million by weight.

Signed and sealed this 5th day of March 1974.

(SEAL)
Attest:

EDWARD M. FLETCHER, JR.
Attesting Officer

C. MARSHALL DANN
Commissioner of Patents